US010394937B2

(12) United States Patent
Fein et al.

(10) Patent No.: US 10,394,937 B2
(45) Date of Patent: Aug. 27, 2019

(54) SYSTEMS AND METHODS FOR RULES-BASED TAG MANAGEMENT AND APPLICATION IN A DOCUMENT REVIEW SYSTEM

(71) Applicant: Universal Analytics, Inc., Reston, VA (US)

(72) Inventors: Bruce Ellis Fein, Great Falls, VA (US); Sergey Tsalkov, Tarzana, CA (US); Nathaniel Daiger, Los Angeles, CA (US); Joseph A.W. Jones, Santa Monica, CA (US)

(73) Assignee: Universal Analytics, Inc., Reston, VA (US)

( * ) Notice: Subject to any disclaimer, the term of this patent is extended or adjusted under 35 U.S.C. 154(b) by 152 days.

(21) Appl. No.: 14/994,970

(22) Filed: Jan. 13, 2016

(65) Prior Publication Data

US 2017/0199848 A1    Jul. 13, 2017

(51) Int. Cl.
*G06F 17/00* (2019.01)
*G06F 17/21* (2006.01)
(Continued)

(52) U.S. Cl.
CPC .......... *G06F 17/218* (2013.01); *G06F 3/0486* (2013.01); *G06F 3/0488* (2013.01);
(Continued)

(58) Field of Classification Search
CPC .... G06F 17/218; G06F 3/0486; G06F 3/0488; G06F 17/30011; G06F 16/93
See application file for complete search history.

(56) References Cited

U.S. PATENT DOCUMENTS

| 8,086,960 | B1 * | 12/2011 | Gopalakrishna | ............................ G06F 17/30896 715/234 |
| 8,165,974 | B2 * | 4/2012 | Privault | ................. G06N 5/043 706/12 |

(Continued)

OTHER PUBLICATIONS http://web.archive.org/web/20151209223613/http://www.gotinder.com:80/.

*Primary Examiner* — Stephen S Hong
*Assistant Examiner* — Marshon L Robinson
(74) *Attorney, Agent, or Firm* — Muir Patent Law PLLC

(57) ABSTRACT

The disclosed embodiments include systems, methods, and computer readable media for applying DR tags using a computing device, comprising: loading a plurality of documents for review into a memory of the portable computing device; displaying, via a display of the portable computing device, a first document of the plurality of documents; receiving, via the display, a first touchscreen user drag-and-drop input related to the first document, wherein the first touchscreen user drag-and-drop input corresponds to a first tag and a first tag value associated with the first tag; upon initiation of the first touchscreen user drag-and-drop input related to the first document, displaying as an overlay to the first document a first visual indicator corresponding to the touchscreen user drag-and-drop input; in response to completion of the first touchscreen user drag-and-drop input, applying to the first document the first tag value corresponding to the first tag; storing, in the memory, the first tag value associated with the first tag in a correspondence with the first document; and in response to the completion of the first touchscreen user drag-and-drop input, displaying a second document of the plurality of documents.

26 Claims, 11 Drawing Sheets

(51) Int. Cl.
*G06F 3/0486* (2013.01)
*G06F 3/0488* (2013.01)
*G06F 16/93* (2019.01)
*G06Q 50/18* (2012.01)
*G06Q 10/10* (2012.01)

(52) U.S. Cl.
CPC ........... *G06F 16/93* (2019.01); *G06Q 10/101* (2013.01); *G06Q 10/103* (2013.01); *G06Q 50/18* (2013.01)

(56) References Cited

U.S. PATENT DOCUMENTS

| | | | |
|---|---|---|---|
| 8,838,606 | B1 | 9/2014 | Cormack et al. |
| 2008/0222168 | A1* | 9/2008 | Morales ............ G06F 17/30657 |
| 2008/0222513 | A1* | 9/2008 | Van Den Berge ........................... H04N 1/00209 715/234 |
| 2010/0312725 | A1* | 12/2010 | Privault .................. G06N 5/043 706/12 |
| 2011/0282916 | A1* | 11/2011 | Torres ............... G06F 17/30011 707/803 |
| 2013/0013996 | A1* | 1/2013 | Wu ................... G06F 17/30011 715/227 |
| 2013/0191711 | A1 | 7/2013 | Tashman et al. |
| 2013/0283147 | A1* | 10/2013 | Wong ..................... G06F 17/21 715/234 |
| 2014/0297341 | A1 | 10/2014 | Srikanth |
| 2014/0317147 | A1* | 10/2014 | Wu ................... G06F 17/30011 707/792 |
| 2015/0220519 | A1* | 8/2015 | Motoyama ........ G06F 17/30011 707/719 |
| 2015/0309972 | A1 | 10/2015 | John et al. |
| 2015/0324451 | A1* | 11/2015 | Cormack ............. G06N 99/005 706/11 |
| 2015/0346916 | A1* | 12/2015 | Jisrawi ................ G06F 3/04817 715/752 |

\* cited by examiner

| DOC_NO | TAGS | TAG_VALUES |
|---|---|---|
| DOC_001 | Relevant | True |
| DOC_001 | Privileged | True |
| DOC_001 | Confidential | False |
| DOC_002 | Relevant | True |
| DOC_002 | Privileged | True |
| DOC_002 | Confidential | True |

| DOC_NO | TAGS_&_VALUES |
|---|---|
| DOC_003 | Is_Relevant |
| DOC_003 | Not_Privileged |
| DOC_004 | Not_Relevant |

SYSTEMS AND METHODS FOR RULES-BASED TAG MANAGEMENT AND APPLICATION IN A DOCUMENT REVIEW SYSTEM

FIELD OF THE INVENTION

This disclosure relates to systems and methods for rules-based tag management and application in a document review (DR) system and, more particularly, to systems and methods for rules-based tag management and application in a DR system using intuitive, gesture-based inputs.

BACKGROUND

In the context of litigation, investigations, and other legal matters, large numbers of documents are often reviewed in the course of the discovery process. To facilitate review, these documents may be in electronic form or may be converted to electronic form. Document review, referred to herein as "DR," may be performed to determine, for example, which documents are relevant/not relevant, privileged/not privileged, confidential/not confidential, etc. Documents that fall into any of these categories may be assigned one or more tags to classify the documents. After the documents have been reviewed and classified, some documents may be withheld, while others may be provided to the opposing party. Typically, DR systems manage the process of DR. However, prior art DR systems and tools can create a work environment that is plagued by monotony, repetitive fine-motor movements, and constrained work conditions. Further, bulky DR tools having cluttered interfaces, which slows the process and inhibits a careful review of the documents. As a result, DR can be costly, in both time and money, and error prone.

The disclosed embodiments have been provided to address these and other shortcomings.

SUMMARY

In some exemplary embodiments, the present disclosure is directed to a computer-implemented method for applying DR tags using a portable computing device, comprising: loading a plurality of documents for review into a memory of the portable computing device; displaying, via a display of the portable computing device, a first document of the plurality of documents; receiving, via the display, a first touchscreen user drag-and-drop input related to the first document, wherein the first touchscreen user drag-and-drop input corresponds to a first tag and a first tag value associated with the first tag; upon initiation of the first touchscreen user drag-and-drop input related to the first document, displaying as an overlay to the first document a first visual indicator corresponding to the touchscreen user drag-and-drop input; in response to completion of the first touchscreen user drag-and-drop input, applying to the first document the first tag value corresponding to the first tag; storing, in the memory, the first tag value associated with the first tag in a correspondence with the first document; and in response to the completion of the first touchscreen user drag-and-drop input, displaying a second document of the plurality of documents.

In some aspects, the computer-implemented method further includes displaying a third document of the plurality of documents; upon initiation of the first touchscreen user drag-and-drop input related to the third document, displaying as an overlay to the third document the first visual indicator; and in response to abortion of the first touchscreen user drag-and-drop input, clearing from the display the overlay to the third document without applying the first tag value corresponding to the first tag to the third document.

In some aspects, the computer-implemented method further includes detecting, via the display, a directional motion of the first touchscreen user drag-and-drop input; and determining a direction of the directional motion.

In some aspects, the computer-implemented method further includes wherein in response to completing of the first touchscreen user drag-and-drop input, a tag value associated with at least one additional tag is applied to the first document.

In some aspects, the computer-implemented method further includes uploading, via a network, the first tag and the first tag value.

In some aspects, the computer-implemented method further includes displaying, via the display, a first visual indicia at a first edge of the display and a second visual indicia at a second edge of the display, wherein the first edge of the display is located at a position to where a user drags the first document to apply a tag value indicating the first document is responsive and the second edge of the display is located at a position to where the user drags the first document to apply a tag value indicating the first document is not responsive.

In some aspects, the computer-implemented method further includes wherein displaying as the overlay to the first document the visual indicator corresponding to the user input further comprises: displaying the first visual indicator with first matching characteristics with the first visual indicia when a responsive tag value is applied to the first document; or displaying the first visual indicator with second matching characteristics with the second visual indicia when a non-responsive tag value is applied to the first document, wherein the first matching characteristics are different from the second matching characteristics.

In some aspects, the computer-implemented method further includes wherein the first matching characteristics are a first color and the second matching characteristics are a second color, different from the first color.

In some aspects, the computer-implemented method further includes displaying, via the display, a selectable indicator button; associating a tag value of a first type for an auxiliary tag to the first document; upon receiving input corresponding to a selection of the selectable indicator button, applying a tag value of a second type for the auxiliary tag to the first document; and storing, in the memory, the tag value of the second type in a record to associate the tag value of the second type with the auxiliary tag and the first document.

In some exemplary embodiments, the present disclosure is directed to a system for applying DR tags using a portable computing device, comprising: at least one storage device storing instructions; and at least one computer processor configured to execute the instructions and to cause the system to perform operations comprising: loading a plurality of documents for review into a memory of the portable computing device; displaying, via a display of the portable computing device, a first document of the plurality of documents; receiving, via the display, first touchscreen user drag-and-drop input related to the first document, wherein the first touchscreen user drag-and-drop input corresponds to a first tag and a first tag value associated with the first tag; upon initiation of the first touchscreen user drag-and-drop input related to the first document, displaying as an overlay to the first document a first visual indicator corresponding to the first touchscreen user drag-and-drop input; in response to completion of the first touchscreen user drag-and-drop input, applying to the first document the first tag value corresponding to the first tag; in response to abortion of the first touchscreen user drag-and-drop input, clearing from the display the first overlay to the first document; storing, in the memory, the first tag value associated with the first tag in a correspondence with the first document; and in response to completion of the first touchscreen user drag-and-drop input, displaying a second document of the plurality of documents.

In some aspects, the system further includes wherein the at least one computer processor is further configured to execute the instructions and to cause the system to perform operations comprising: detecting, via the display, a directional motion of the first touchscreen user drag-and-drop input; and determining a direction of the directional motion.

In some aspects, the system further includes wherein the at least one computer processor is further configured to execute the instructions and to cause the system to perform operations comprising: in response to completing of the first touchscreen user drag-and-drop input, a tag value associated with at least one additional tag is applied to the first document.

In some aspects, the system further includes wherein the at least one computer processor is further configured to execute the instructions and to cause the system to perform operations comprising: uploading, via the network, the first tag and the first tag value.

In some aspects, the system further includes wherein the at least one computer processor is further configured to execute the instructions and to cause the system to perform operations comprising: displaying, via the display, a first visual indicia at a first edge of the display and a second visual indicia at a second edge of the display, wherein the first edge of the display is located at a position to where a user drags the first document via to apply a tag value indicating the first document is responsive and the second edge of the display is located at a position to where the user drags the first document to apply a tag value indicating the first document is not responsive.

In some aspects, the system further includes wherein the at least one computer processor is further configured to execute the instructions and to cause the system to perform operations comprising: displaying the first visual indicator with first matching characteristics with the first visual indicia when a responsive tag value is applied to the first document; or displaying the first visual indicator with second matching characteristics with the second visual indicia when a non-responsive tag value is applied to the first document, wherein the first matching characteristics are different from the second matching characteristics.

In some aspects, the system further includes wherein the at least one computer processor is further configured to execute the instructions and to cause the system to perform operations comprising: displaying, via the display, a selectable indicator button; associating a tag value of a first type for an auxiliary tag to the first document; upon receiving input corresponding to a selection of the selectable indicator button, applying a tag value of a second type for the auxiliary tag to the first document; and storing, in the memory, the tag value of the second type in a record to associate the tag value of the second type with the auxiliary tag and the first document.

In some exemplary embodiments, the present disclosure is directed to a non-transitory computer-readable storage medium storing instructions for applying DR tags using a portable computing device, the instructions causing one or more computer processors to perform operations according to a method comprising: loading a plurality of documents for review into a memory of the portable computing device; displaying, via a display of the portable computing device, a first document of the plurality of documents; receiving, via the display, a first touchscreen user drag-and-drop input related to the first document, wherein the first touchscreen user drag-and-drop input corresponds to a first tag and a first tag value associated with the first tag; upon initiation of the first touchscreen user drag-and-drop input related to the first document, displaying as an overlay to the first document a first visual indicator corresponding to the touchscreen user drag-and-drop input; in response to completion of the first touchscreen user drag-and-drop input, applying to the first document the first tag value corresponding to the first tag; storing, in the memory, the first tag value associated with the first tag in a correspondence with the first document; and in response to the completion of the first touchscreen user drag-and-drop input, displaying a second document of the plurality of documents.

In some aspects, the non-transitory computer-readable storage medium further includes detecting, via the display, a directional motion of the first touchscreen user drag-and-drop input; and determining a direction of the directional motion.

In some aspects, the non-transitory computer-readable storage medium further includes displaying, via the display, a first visual indicia at a first edge of the display and a second visual indicia at a second edge of the display, wherein the first edge of the display is located at a position to where a user drags the first document to apply a tag value indicating the first document is responsive and the second edge of the display is located at a position to where the user drags the first document to apply a tag value indicating the first document is not responsive.

In some aspects, the non-transitory computer-readable storage medium further includes wherein displaying as the overlay to the first document the visual indicator corresponding to the user input further comprises: displaying the first visual indicator with first matching characteristics with the first visual indicia when a responsive tag value is applied to the first document; or displaying the first visual indicator with second matching characteristics with the second visual indicia when a non-responsive tag value is applied to the first document, wherein the first matching characteristics are different from the second matching characteristics.

BRIEF DESCRIPTION OF THE DRAWINGS

The above and other objects and features will become apparent from the following description with reference to the following figures, wherein like reference numerals refer to like parts throughout the various figures unless otherwise specified. The drawings are not necessarily to scale, emphasis instead being placed upon illustrating the principles of the disclosed embodiments. In the drawings:

FIG. 5 is an exemplary screenshot of DR performed on a DR system, consistent with certain disclosed embodiments;

FIG. 6 is an exemplary screenshot of DR performed on a DR system, consistent with certain disclosed embodiments;

FIGS. 9A and 9B are exemplary screenshots of DR performed on a DR system, consistent with certain disclosed embodiments;

DETAILED DESCRIPTION

Figure 1:
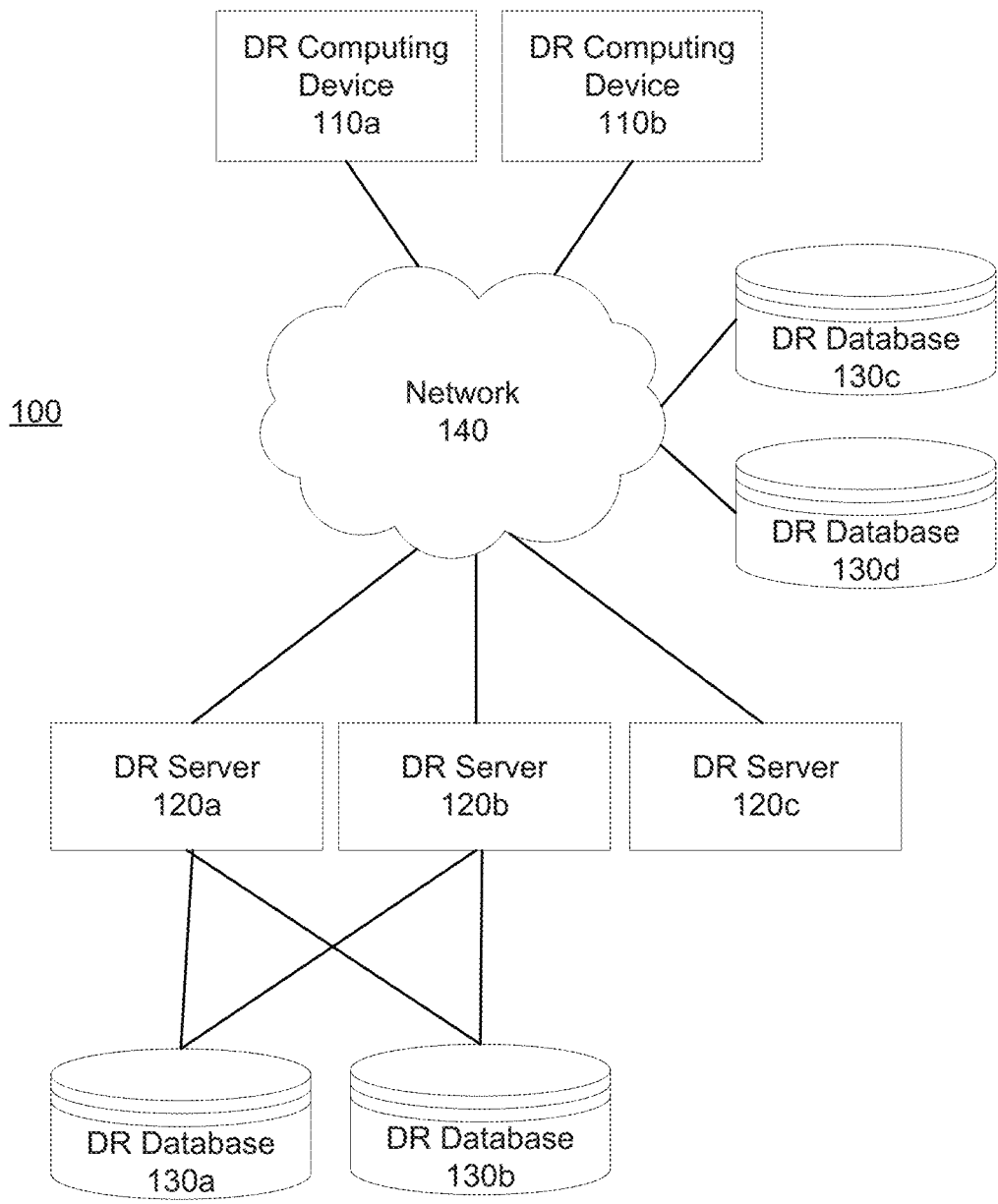
FIG. 1 is a diagram illustrating an exemplary DR system, consistent with certain disclosed embodiments.

Various exemplary embodiments will be described in detail with reference to the accompanying drawings. The inventive concept, however, may be embodied in various different forms, and should not be construed as being limited only to the illustrated embodiments. Accordingly, known processes, elements, and techniques are not described with respect to some of the embodiments of the disclosure. Unless otherwise noted, like reference numerals denote like elements throughout the attached drawings and written description, and thus descriptions will not be repeated. In the drawings, the sizes and relative sizes of layers and regions may be exaggerated for clarity.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising" or "includes" and/or "including," when used in this specification, specify the presence of stated features, regions, integers, steps, operations, elements, components, and/or groups, but do not preclude the presence or addition of one or more other features, regions, integers, steps, operations, elements, components, and/or groups thereof. In addition, unless the context indicates otherwise, steps described in a particular order need not occur in that order. As used herein, the term "and/or" includes any and all combinations of one or more of the associated listed items.

It will be understood that, although the terms "first," "second," "third," etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

As will be understood, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood, all language such as "up to," "at least," "greater than," "less than," and the like include the number recited and refer to ranges which can be subsequently broken down into subranges as discussed above. Finally, as will be understood, a range includes each individual member. Thus, for example, a group having 1-3 members refers to groups having 1, 2, or 3 members. Similarly, a group having 1-5 members refers to groups having 1, 2, 3, 4, or 5 members, and so forth.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein. In general, in a DR system, a document is a record of information that is either generated in electronic form or transferred to electronic form and stored in a computer system and one or more files.

The systems and methods for performing DR, as disclosed and described herein, may enable users to apply one or more predefined or user-selected tags and/or tag values, or templates (meaning a predefined set of one or more tags and/or tag values) to the matter presented (e.g., document) by way of a limited number of gestures or movements, such as, for example, "swipe," "drag," "drag-and-drop," and/or "drag-and-release" movements. A swipe may include, for example, any linear movements or gestures typically across a display (e.g., linearly moving a finger across a touchscreen). The linear movement may be a single linear movement (e.g., up, down, left, right, diagonal upper left, diagonal upper right, diagonal lower left, diagonal lower right, etc.) or combination of single linear movements (e.g., up and left, up and diagonal upper right, down and right, diagonal lower left and left, etc.). A "drag-and-drop" may include a swipe gesture (e.g., a "swipe" followed by a removal of the finger from the touchscreen). A "drag-and-drop" input refers to the completed user input.

In some exemplary embodiments, the simplified application of tags and/or tag values, or templates, may be achieved through, for example, a dragging or swiping motions on a touch-screen display. The tags and/or tag values, or one or more templates applied may differ depending on the direction of the gesture or movement (e.g., the direction in which the user drags the document or inputs commands via swipes). The user can predefine the templates, including tags and/or tag values, available for application and associate each template with different directional dragging movements, motions, or swipes. A drag or swipe input by a user may act to both apply a template, tags, and/or tag values to the document, as well as cause the system or method to display the next document for review. In addition, the document may be reviewed by the user with minimal or no display of additional user input indicia (e.g., allowing review of the document without a menu bar or "buttons") to avoid unnecessary distraction to the user when performing DR. Indicia may be displayed (in addition to displaying the document) to the user only after the user has determined to provide a certain template, tags and/or tag values to the document or decided to skip the document to review later.

FIG. 1 is a diagram illustrating a DR system, consistent with certain disclosed embodiments. As shown in FIG. 1, an example DR system 100 may include or more DR computing devices 110 (e.g., DR computing device 110a and DR computing device 110b), one or more DR servers 120 (e.g., DR server 120a, DR server 120b, and DR server 120c) and one or more DR databases 130 (e.g., DR database 130a, DR database 130b, DR database 130c, and DR database 130d), which may be owned, operated, and/or managed by a DR service provider (not shown and network 140.

DR computing devices 110 may be any type of electronic device and/or component configured to execute one or more processes, many of which are known in the art. DR computing devices 110 can include, by way of example and not limitation, tablet computers and electronic readers including those having touchscreen capabilities, smartphones and other telephony devices, client and network computers, desktop or laptop computers, personal digital assistants (PDAs), etc., or any component or sub-component of another DR computing device 110. Although not illustrated, DR computing devices 110 can also include servers and/or databases. DR computing devices 110 may be configured to transmit and/or receive information to and/or from other DR computing devices 110, DR servers 120, and/or DR databases 130 directly and/or indirectly via any combination of wired and/or wireless communication systems, method, and devices, including, for example, network 140.

DR servers 120 can be physical computers, or computer systems, configured to run one or more services to support users of other computers on one or more networks and/or computer programs executing on physical computers, or computer systems, and configured to serve the requests of other programs that may be operating on one or more servers (not shown) or on other computing devices, such as DR computing devices 110. DR servers 120 can include, by way of example and not limitation, communication servers, database servers, fax servers, file servers, mail servers, print servers, name servers, web servers, proxy servers, etc. In some aspects, DR servers 120 may be configured to transmit and/or receive information to and/or from DR computing devices 110 and DR servers 120, other servers (e.g., Internet Service Provider (ISP) servers (not shown), etc.), and/or DR databases 130 directly and/or indirectly via any combination of wired and/or wireless communication systems, method, and/or devices, including, for example, network 140. DR servers 120 may include one or more physical servers, or server systems, and/or one or more proxy servers, each configured to run one or more services to support other computers or computer systems, such as, for example, client computer systems (not shown). In certain embodiments, the same server devices may perform the roles of physical DR servers 120 and/or proxy DR servers 120.

DR databases 130 can be one or more computing devices configured to store databases (e.g., organized collections of data and their data structures), and/or execute database management systems (e.g., computer programs configured to control the creation, maintenance, and use of the database). Collectively, databases and their database management systems can be referred to as database systems. As used herein, DR databases 130 can refer to databases, database management systems, and/or database systems. In some aspects, DR database 130 can be configured to store databases, while database management systems are stored and executed on one or more remote computing devices, such as DR computing devices 110, and/or one or more remote computing devices, such as DR servers 120. In one implementation, DR databases 130 can include software database programs configured to store data associated with DR servers 120 and their associated applications or processes, such as, for example, standard databases or relational databases. DR databases 130 can include relationship database management systems (RDBMS) that may be configured to run as a server on DR servers 120. In some embodiments, DR databases 130 can be configured to transmit and/or receive information to and/or from DR computing devices 110, DR servers 120, and/or other DR databases 130 directly and/or indirectly via any combination of wired and/or wireless communication systems, method, and/or devices, including, for example, network 140. For example, DR databases 130a and 130b may transmit and/or receive information to and/or from DR computing devices 110 via one of DR servers 120a and 120b.

In some embodiments, one or more components of DR system 100 may be redundant to provide backup mechanisms in the event of failure or unavailability within DR system 100. In DR system 100 network redundancies may be achieved by the addition of alternate resources, such as additional DR servers 120 and/or DR databases 130. For example, as illustrated in FIG. 1, DR servers 120a and 120b may be redundant to one another, thereby providing alternate servers to transmit and/or receive information to/from DR databases 130a and 130b, which are redundant to one another.

Network 140 may be any appropriate network or other communication link that allows communication between or among one or more computing systems and/or devices, such as, for example, DR computing devices 110. DR servers 120, and DR databases 130. Network 140 may be wired, wireless, or any combination thereof. Network 140 may include, for example, the Internet, a local area network, a wide area network, a WiFi network, a workstation peer-to-peer network, a direct link network, a Bluetooth connection, a bus, or any other suitable communication network or any combination thereof.

In the embodiment of FIG. 1, DR computing devices 110, DR servers 120 and/or DR databases 130 may communicate via network 140 using standard Internet Protocols, such as HTTP, transmission control protocol (TCP), internet protocol (IP), etc. For example, HTTP requests from DR computing devices 110 may be encapsulated in TCP segments, IP datagrams, and Ethernet frames and transmitted DR servers 120. In some embodiments, third parties may participate as intermediaries in the communication, such as, for example, Internet Service Providers (ISPs) or other entities that provide routers and link layer switches. Such third parties may not, however, analyze or review the contents of the Ethernet frames beyond the link layer and the network layer, but instead analyze only those parts of the packet necessary to route communications, for example, between DR computing devices 110 and DR servers 120. Although FIG. 1 depicts communications between DR computing devices 110, DR servers 120 and/or DR databases 130 using an indirect network connection, such as a connection through network 140, those skilled in the art will appreciate that DR computing devices 110, DR servers 120 and/or DR databases 130 may also communicate using a direct communications link or a communications link separate from network 140.

The system 100 may be used, for example, to allow for a decrease in the number of movements or actions required to appropriately categorize—or tag—documents. As a result of the embodiments disclosed herein, system 100 may allow for increased speed in the document production through, for example, increased intuitiveness, reduced number of required/repetitive movements or actions, simultaneous application of defined multiple tags, reduced error rate and improved quality, improved working conditions, etc.

Figure 2:
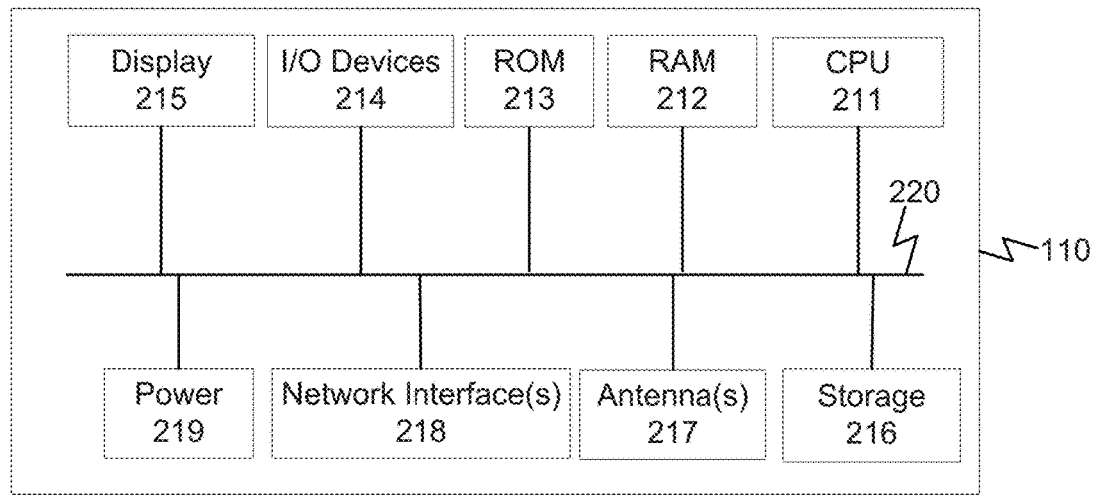
FIG. 2 is a diagram illustrating an exemplary DR computing device, consistent with certain disclosed embodiments.

FIG. 2 is a block diagram of an example DR computing device 110, consistent with certain disclosed embodiments. It should be readily apparent that the example DR computing device 110 depicted in FIG. 2 represents a generalized schematic illustration and that other components/devices can be added, removed, or modified. In some embodiments, DR computing device can be a tablet computer, electronic reader, or other portable computing device configured to have touchscreen capabilities.

As shown in FIG. 2, each DR computing device 110 can include one or more of the following components: at least one central processing unit (CPU) 211 configured to execute computer program instructions to perform various processes and methods, random access memory (RAM) 212 and read only memory (ROM) 213 configured to access and store data and information and computer program instructions, I/O devices 214 configured to provide input and/or output to DR computing device 110 (e.g., keyboard, mouse, speakers, printers, modems, network cards, etc.), and display 215. In certain embodiments, display 215 may allow for a user to input commands and/or other information via touchscreen capabilities of display 215. Further, each DR computing device 110 can include storage media 216 or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files are stored.

In addition, each DR computing device 110 can include antennas 217, network interfaces 218 that provide wireless and/or wire line digital and/or analog interface to one or more networks, such as network 140, over one or more network connections (not shown), a power source 219 that provides an appropriate alternating current (AC) or direct current (DC) to power one or more components of DR computing device 110, and a bus 220 that allows communication among the various disclosed components of DR computing device 110 of FIG. 2. Each of these components is well-known in the art and will not be discussed further.

Although not shown, each DR computing device 110 can include one or more mechanisms and/or devices by which DR computing device 110 can perform the methods as described herein. For example, DR computing device 110 can include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, etc. These mechanisms and/or devices can include any combination of hardware and/or software components and can be included, in whole or in part, in any of the components shown in FIG. 2. In one or more exemplary designs of DR computing device 110, the functions described can be implemented in hardware, software, firmware, or any combination thereof. If implemented in software, the functions can be stored as one or more instructions or code on computer-readable medium, including the computer-readable medium described above (e.g., RAM 212, ROM 213, storage media 216, etc.).

Figure 3:
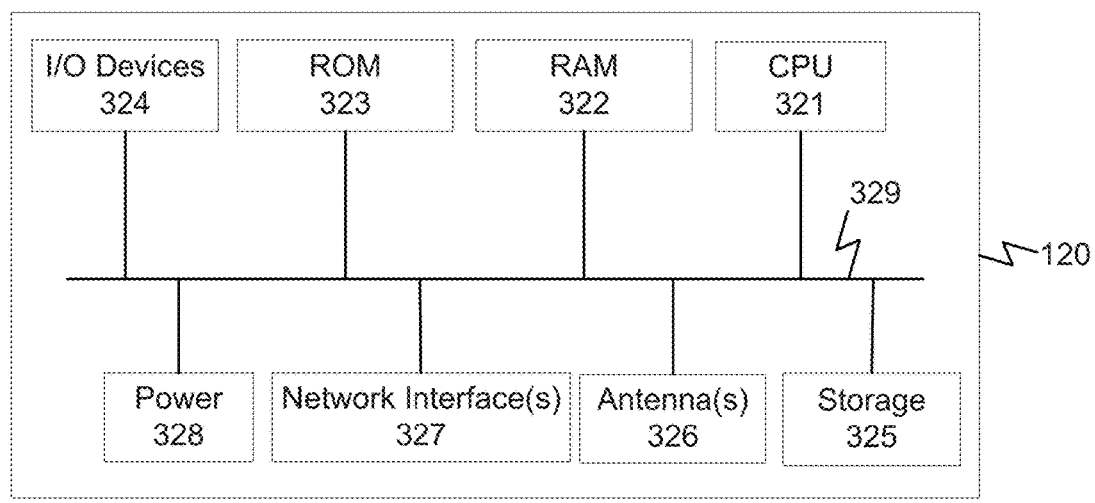
FIG. 3 is a diagram illustrating an exemplary DR server, consistent with certain disclosed embodiments.

FIG. 3 is a block diagram of an example DR server 120, consistent with certain disclosed embodiments. It should be readily apparent that the example DR server 120 depicted in FIG. 3 represents a generalized schematic illustration and that other components/devices can be added, removed, or modified.

As shown in FIG. 3, each DR server 120 can include one or more of the following components: at least one central processing unit (CPU) 321 configured to execute computer program instructions to perform various processes and methods, random access memory (RAM) 322 and read only memory (ROM) 323 configured to access and store data and information and computer program instructions, I/O devices 324 configured to provide input and/or output to DR server 120 (e.g., keyboard, mouse, display, speakers, printers, modems, network cards, etc.), and storage media 325 or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files are stored.

In addition, each DR server 120 can include antennas 326, network interfaces 327 that provide wireless and/or wire line digital and/or analog interface to one or more networks, such as network 140, over one or more network connections (not shown), a power source 328 that provides an appropriate alternating current (AC) or direct current (DC) to power one or more components of DR server 120, and a bus 329 that allows communication among the various disclosed components of DR server 120 of FIG. 3. Each of these components is well-known in the art and will not be discussed further.

Although not shown, DR server 120 can include one or more mechanisms and/or devices by which DR server 120 can perform the methods as described herein. For example, DR server 120 can include one or more encoders, one or more decoders, one or more interleavers, one or more circular buffers, one or more multiplexers, one or more de-multiplexers, one or more permuters, one or more decryption units, one or more demodulation units, one or more arithmetic logic units and/or their constituent parts, etc. These mechanisms and/or devices can include any combination of hardware and/or software components and can be included, in whole or in part, in any of the components shown in FIG. 3. In one or more exemplary designs of DR server 120 of FIG. 3, the functions described can be implemented in hardware, software, firmware, or any combination thereof. If implemented in software, the functions can be stored as one or more instructions or code on computer-readable medium, including the computer-readable medium described above (e.g., RAM 322, ROM 323, and storage media 325).

Figure 4:
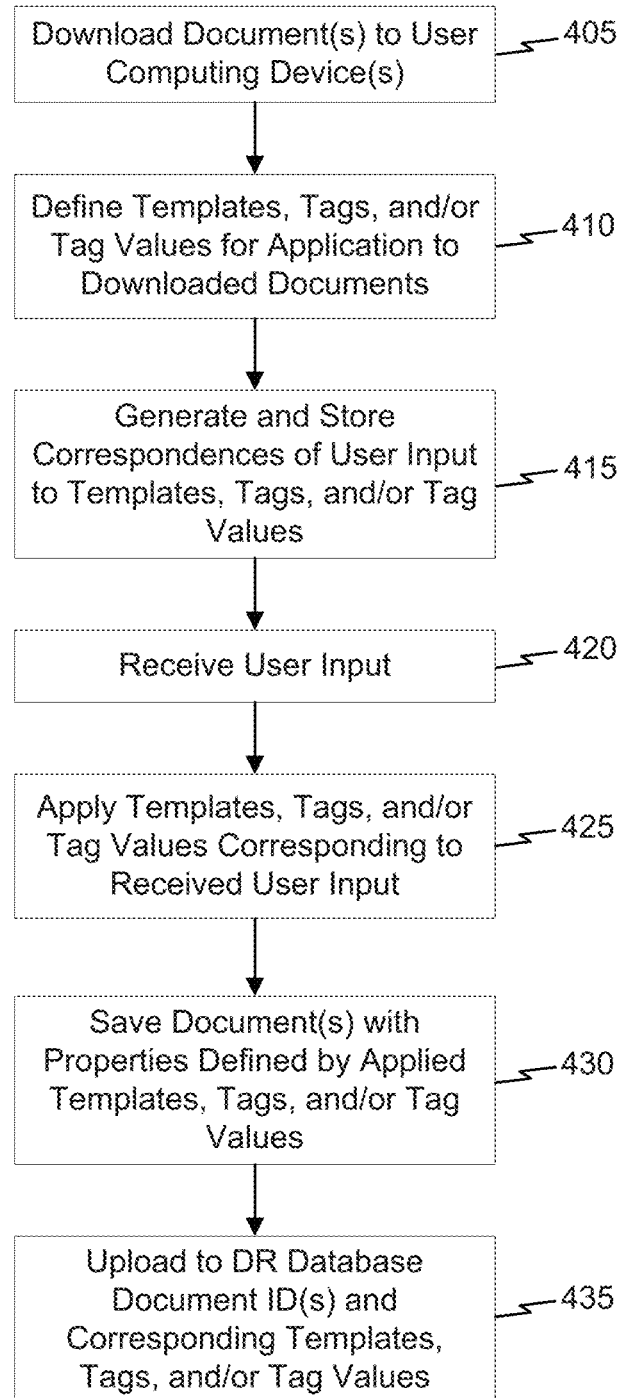
FIG. 4 is a flowchart illustrating an exemplary method of performing DR, consistent with certain disclosed embodiments.

FIG. 4 is a flowchart 400 illustrating an exemplary method for performing DR, consistent with certain disclosed embodiments. As shown in FIG. 4, the disclosed systems and methods may enable a user to apply predefined or user-selected tags and/or tag values, as well as templates (each template including one or more tags and/or tag values) to documents using a minimal number of movement or sweeps, typically only a single gesture or movement. In some embodiments, the user can predefine the templates to be applied and associate them with different directional swipes (or keyboard shortcuts). Thus, for example, the template to be applied to a document may differ depending on the direction in which the user drags or sweeps the document. The method illustrated by flowchart 400 may be implemented using, for example, one or more DR computing devices 110, DR servers 120, and DR databases 130.

Figure 5:
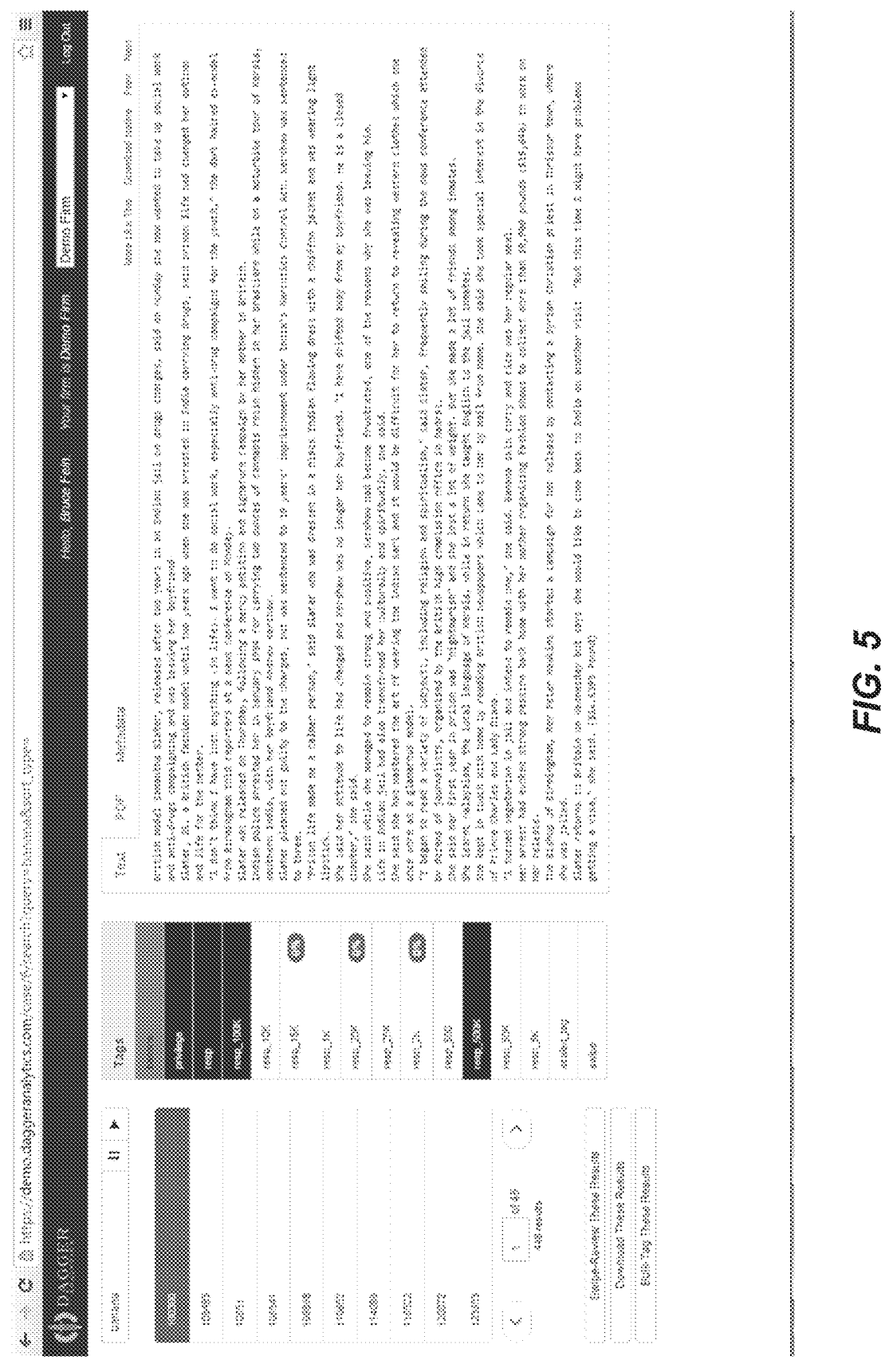

Initially, one or more documents and corresponding document properties (such as tags, tag values, and metadata) to be reviewed may be downloaded to one or more DR computing devices 110 (405). The documents may be downloaded from DR servers 120 and/or DR databases 130 via, for example, network 140. In some embodiments, the documents to be downloaded may be defined or determined through user input. For example, referring to screenshot 500 of FIG. 5, DR computing device 110 of DR system 100 may enable a user to identify the population of documents to be presented and user-categorized through a search utility or mechanism. Documents and their corresponding properties may be downloaded sequentially one at-a-time, or may be downloaded simultaneously (altogether or in groups).

Returning to FIG. 4, the user may define one or more tags that may be applied to each of the downloaded documents (410). For example, DR computing device 110 of DR system 100 may enable the user to define one or more tags, where each tag is associated with a tag value. The tags and/or tag values may indicate, for example, whether a document is relevant/not relevant, privileged/not privileged, confidential/not confidential, etc. In some examples, each tag may be associated with a binary tag value (i.e., a tag value of "TRUE" (e.g., represented by a data binary value of "1") or a tag value of "FALSE" (e.g., represented by a data binary value of "0")). For example, a tag of "Relevant" may have a corresponding data value that includes the binary values of "TRUE" or "FALSE", a tag of "Privileged" may have a corresponding data value that includes the binary values of "TRUE" or "FALSE," a tag of "Confidential" may have a corresponding data value that includes the binary values of "TRUE" or "FALSE," etc. Alternatively and/or additionally, a tag may include the tag value. For example, a tag of "Is_Relevant" may be equivalent to a combined tag/tag value of "Relevant"/"TRUE," a tag of "Not_Relevant" may be equivalent to a combined tag/tag value of "Relevant"/"FALSE," a tag of "Privileged" may be equivalent to a combined tag/tag value of "Privileged"/"TRUE," a tag of "Not_Privileged" may be equivalent to a combined tag/tag value of "Privileged"/"FALSE," etc. In some examples, tag values may include a range of numbers (e.g., 1, 2, 3, 4 or 5) which may provide a weighting of an associated tag (e.g., indicating a degree of relevancy to a particular issue or document request).

The user may also define templates (each including one or more preset tags and/or tag values) that may be applied to the document upon receiving a corresponding predefined drag-and-drop input. For example, a first template may include tags that identify a document as relevant, not privileged, and not confidential, a second template may include tags that identify a document as relevant, privileged, and not confidential, a third template may include tags that identify a document relevant, not privileged, and confidential. Documents assigned the first template may be produced without further review; documents assigned the second template may be subject to further review and, as appropriate, may be withheld or produced with redactions; and documents assigned the third template may be produced and, in some cases, labeled in accordance with a protective order or the like. Each template may be associated with a different predefined drag-and-drop input (e.g., different touchscreen swipes to different corners of the display, each corner being assigned to a different template) so that upon completion of a drag-and-drop input, the template assigned to the drag-and-drop input (e.g., a plurality of tags and associated tag values) is applied to the document and the next document is displayed to the user. The number of templates and the combination of tags encompassed within each template is not limited to those described herein, and tags/tag values may be repeated across templates. In some embodiments, the number of templates and types/combinations of tags may be modified and/or changed in accordance with a particular legal matter or DR project.

Figure 6:
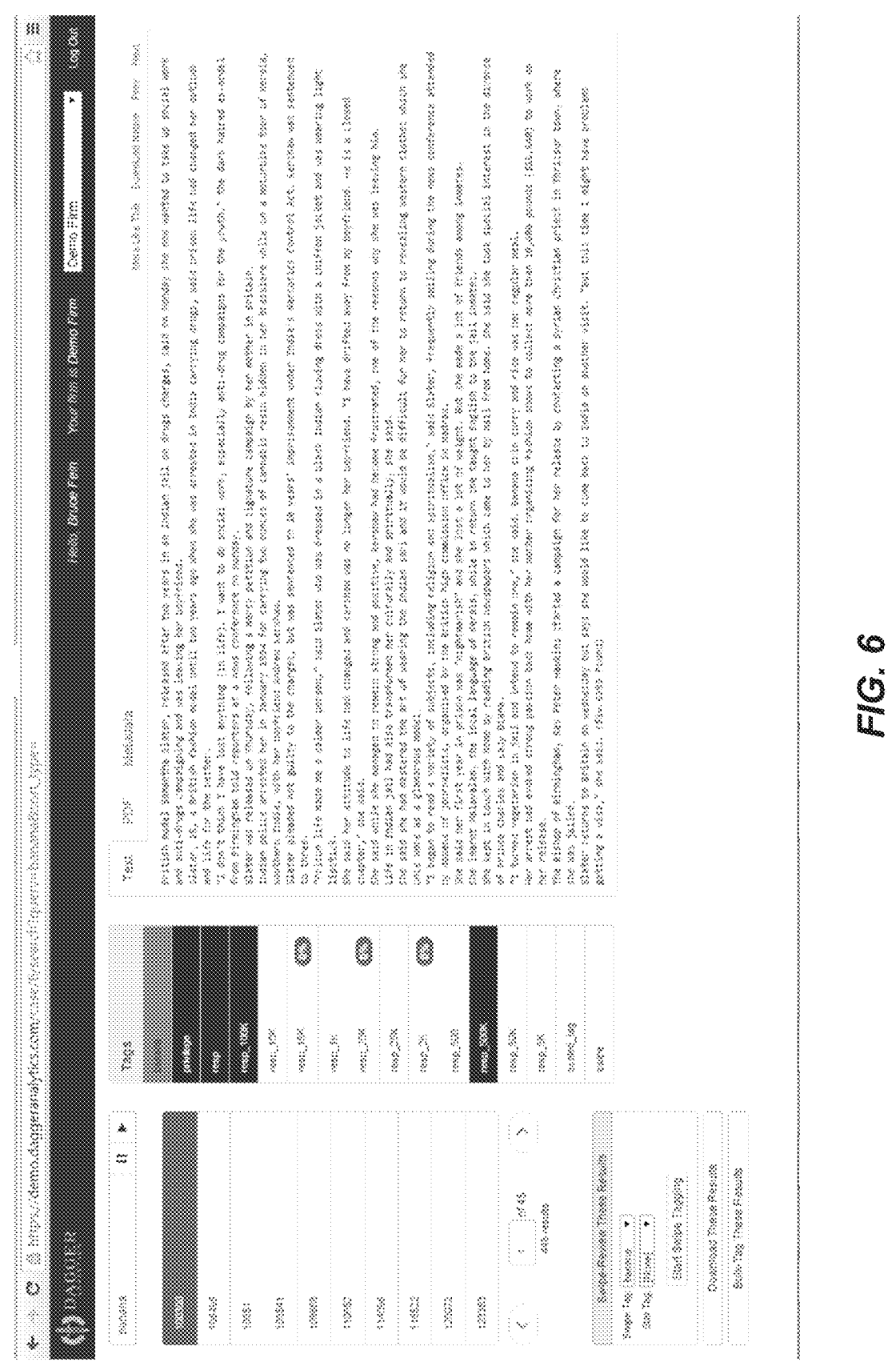

In some embodiments, when the DR computing device 110 of DR system 100 enables the user to define the templates associated with tagging via a user swipe or drag input, the DR computing device 110 of DR system 100 may further allow the user to define further tag/tag values for tagging the document. For instance, referring to screenshot 600 of FIG. 6, the DR computing device 110 of DR system 100 may enable identification of certain user-specified templates, tags, and/or tag values that may be applied by, for example, tapping on a button (e.g., a star symbol). In certain embodiments, a default template and/or tag/tag value may be associated with this additional button (e.g., "privileged"). In certain embodiments, a default tag/tag value may be applied automatically to the document unless the button is tapped or clicked (e.g., the tag of "Privileged" and a tag value of "FALSE" unless the star button is tapped). Assigning templates to predetermined user inputs (e.g., to swipe or drag operations or certain button taps) may enable a user to more quickly and efficiently review documents, and assign one or more tags to the documents in the course of the DR process.

Based on the user-defined settings, the DR computing device 110 of DR system 100 may generate and save a correspondence between the user input and the defined templates, tags, and/or tag values (415). The correspondence may be, for example, one or more tables that define the tags to be applied based on the user input.

When a document is presented to a user via display 215, the display 215 may reflect the relationship between the user input and the corresponding system action. In one embodiment, for example, thin visual cue sidebars at the far edge of the display 215 may be provided with patterns and/or colors (e.g., green, red, etc.) and may be displayed on either side of a screen page as visual cues or indicators as to which direction corresponds to which templates. FIGS. 5, 6, 7, 8, 9A and 9B, illustrate a positive visual cue sidebar 710 and a negative visual cue sidebar 720, shown in the diagrams with check and dot patterns to represent a recognized visual cue associated with a positive action (e.g., an affirmative indication to apply a first template) and a negative or opposite action (e.g., an affirmative indication to not apply the first template), for example, the colors of red and green. Thus, referring to screenshot 700 of FIG. 7, as an example, if a left-to-right swipe or "drag-and-drop" gesture is defined to correspond to a positive application of a first template (e.g., indicating the document is responsive, not privileged, and not confidential), the screen may show a green-colored visual cue sidebar 710 (e.g., thick line, block, etc.) to the right of the displayed document. And, if a right-to-left swipe or "drag-and-drop" gesture is defined to correspond to a negative application of the first template (e.g., indicating the document is one or more of not responsive, privileged, or confidential), the screen may show a red-colored visual cue sidebar 720 (e.g., thick line, block, etc.) to the left of the displayed document. Alternatively, the right-to-left swipe or "drag-and-drop" gesture is defined to correspond to a positive application of a second template (e.g., indicating the document is responsive, privileged, and not confidential). Thus, the visual cue sidebars 710 and 720 may be positioned at locations that correspond to the direction that the document will be dragged and provide a visual indicator corresponding to the template to be applied (e.g., green for a positive application of the first template, and red for negative application of the first template or, alternatively, positive application of a second template) to be applied to the document when the document is dragged in the direction of the corresponding visual cue sidebar. Visual indicators other than, or in addition to, color may be used. For example, a vertical line of green check marks may be used as the positive visual cue sidebar (at a location associated with direction of the positive drag) and a vertical line of red "x" marks may be used as the negative visual cue sidebar (at a location associated with the direction of the negative drag).

In an exemplary implementation, a tag defined as "responsive" is associated with the swipe or draft user input. Specifically, dragging the document to the right of the screen may indicate that the document is "responsive" (associating a tag value of "TRUE" or applying an "Is_Responsive" tag to the document) and dragging the document to the left of the screen may indicate that the document is not "Responsive" (associating a tag value of "FALSE" or applying a "Not_Responsive" tag to the document). In this example, the DR computing device 110 of DR system 100 may default so that an expected majority of the applied templates, tags, and/or tag values corresponds to a drag direction most comfortable to the user (e.g., a right-to-left swipe for right-handers, a left-to-right drag for left-handers, etc.). More specifically, the DR computing device 110 of DR system 100 may default to a right-to-left swipe to input a "FALSE" or negative for a "Responsive" tag (indicating the document is not responsive) and a left-to-right swipe to input a "TRUE" or positive for the "Responsive" tag (indicating the document is responsive). As the majority of documents in a typical DR are not responsive and users are more likely than not right-handed, this default setting increases the likelihood of a comfortable user experience. In addition, as it is typical that all documents to be reviewed should be tagged as either responsive or non-responsive, by using a drag input to apply a tag to the responsive category, all such documents may have a required tag applied in a simple, efficient and ergonomically-friendly manner.

In some embodiments, the DR computing device 110 of DR system 100 may allow user input to change the location or direction (e.g., right, left, etc.) to where the document should be dragged to provide the appropriate tag. For example, when the user is left-handed rather than right-handed, the left-handed user may input a left-handed user input (e.g., check a box indicating such dominant hand type at a user input menu). Using the example of templates having a single tag/tag value to illustrate, a system setting (e.g., set by a user input) indicating a left-handed user may cause the system to apply a "FALSE" or negative value to the responsive tag upon the user dragging the document left-to-right and a "TRUE" or positive value to the responsive tag upon the user dragging the document right-to-left. In addition, although not illustrated, in response to the dominant hand setting input by a user, the location of the thin visual cue sidebars may be switched so that negative visual cue side bar 720 may be located on the right side of the document and the positive visual cue side bar 710 may be located on the left side of the document.

Figure 7:
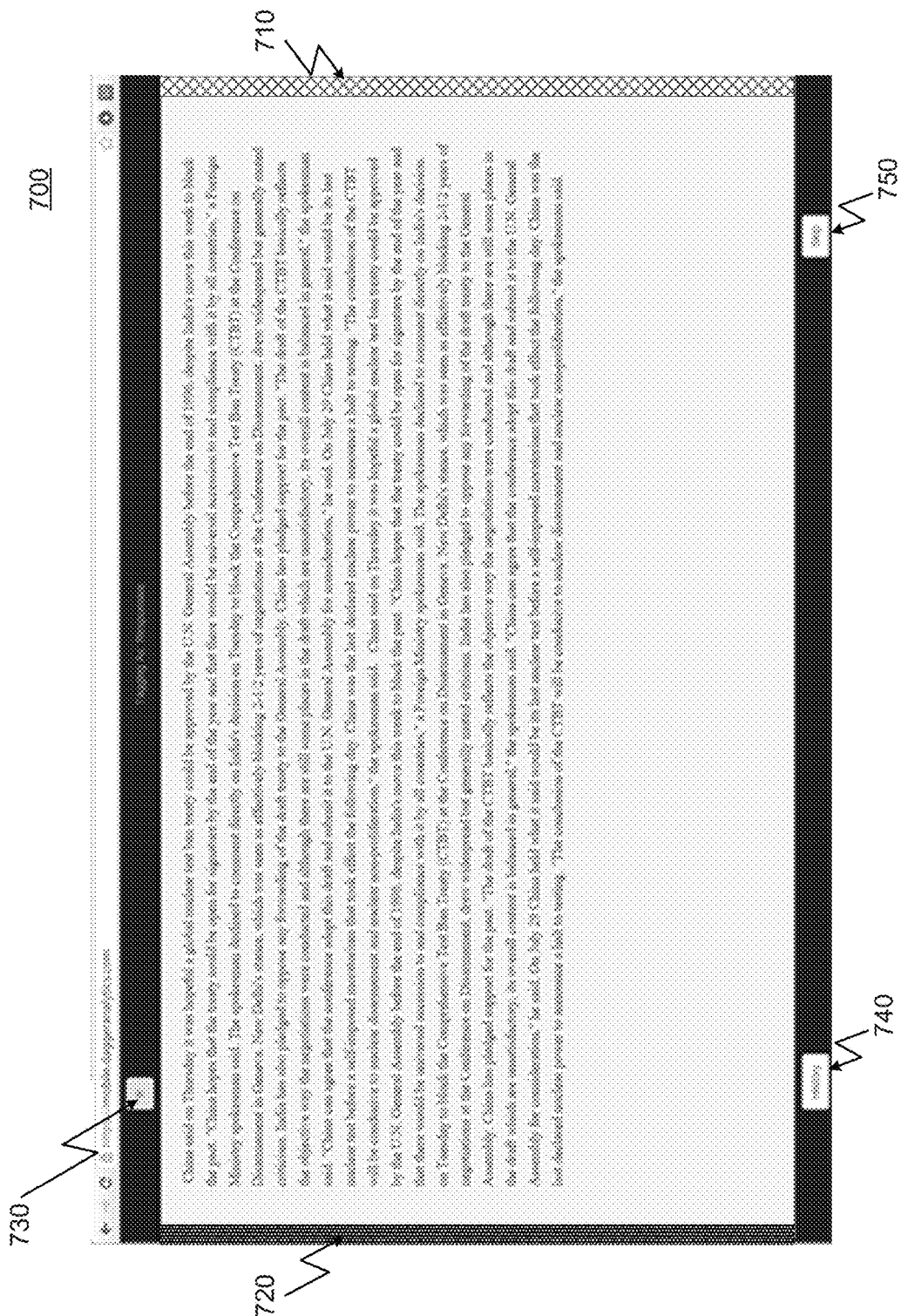
FIG. 7 is an exemplary screenshot of DR performed on a DR system, consistent with certain disclosed embodiments.
Figure 9A:
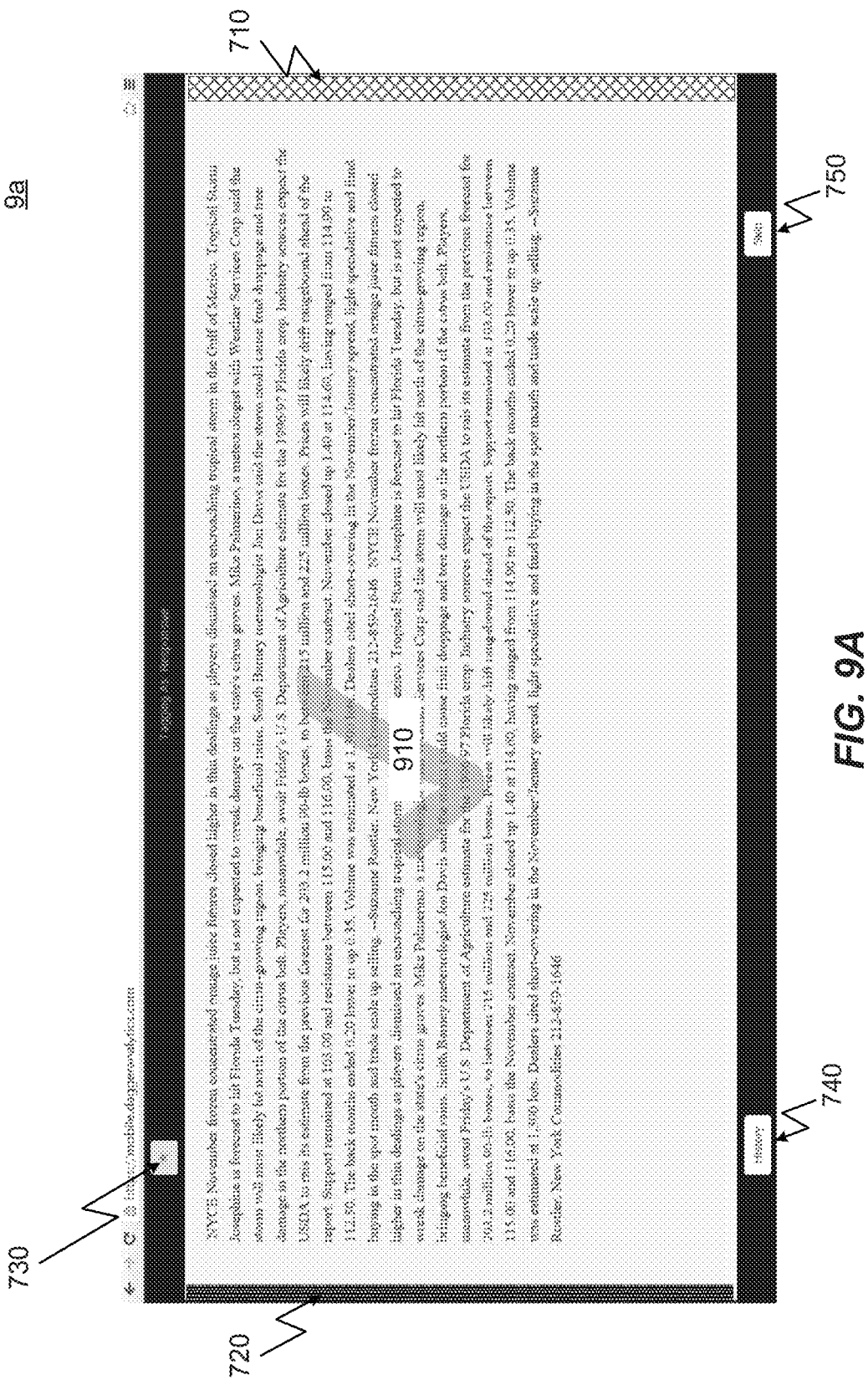
Figure 9B:
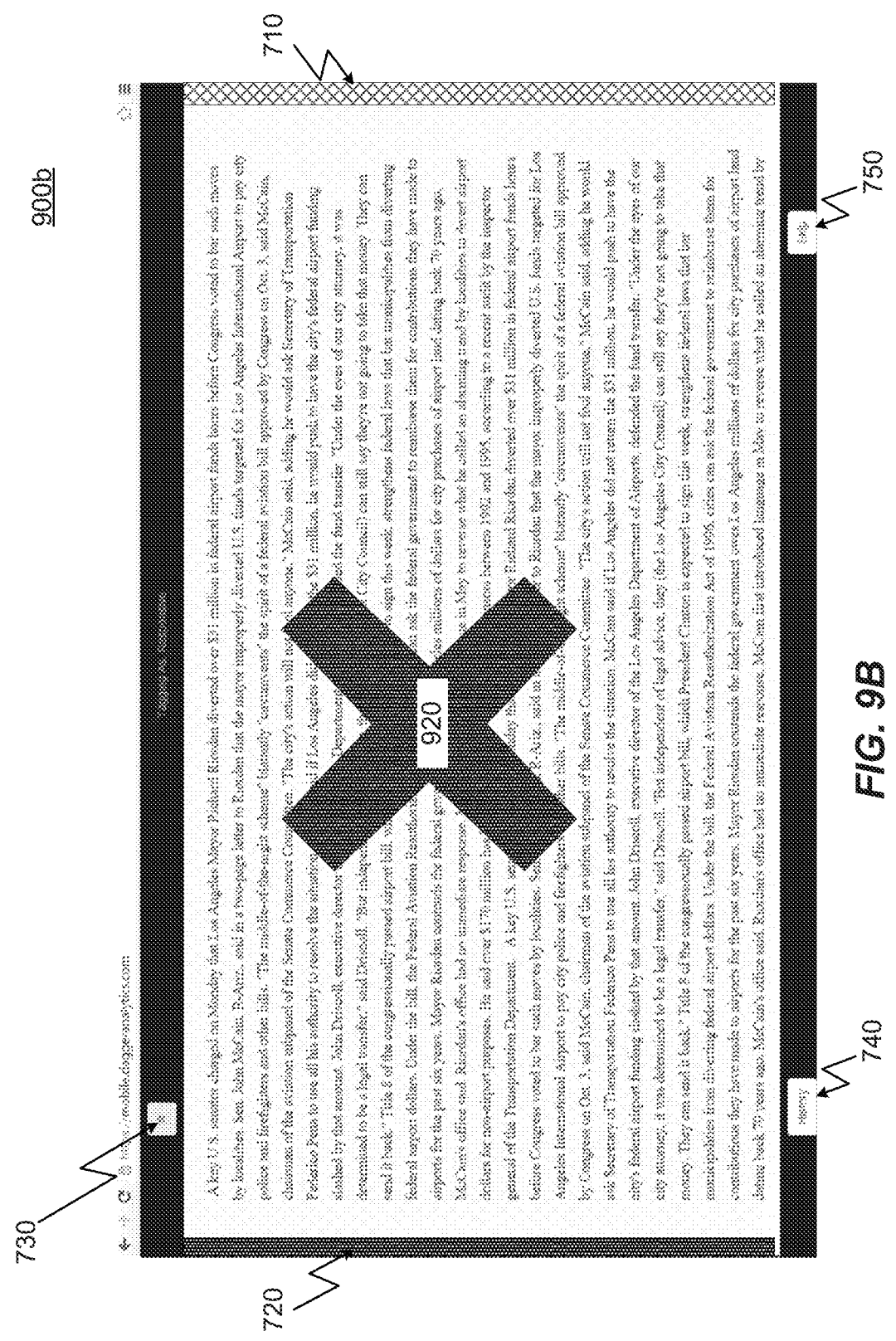

Although the screen format may be designed to provide an uncluttered appearance, as further illustrated in FIG. 7, a limited number of other buttons may be enabled. For example, as illustrated in FIGS. 7, 9A, and 9B, other buttons may include a "star" symbol 730, a "history" button 740, and a "skip" button 750. In certain embodiments, for example, when the user selects the "skip" button 750, the system may skip over a document without assigning a template to the document or otherwise applying any tags or ag values. And, as another example, when the user selects the "history" button 740, the system may display on display 215 the history of reviewed documents, including applied templates, including tags and/or tag values, and any notes.

Figure 8:
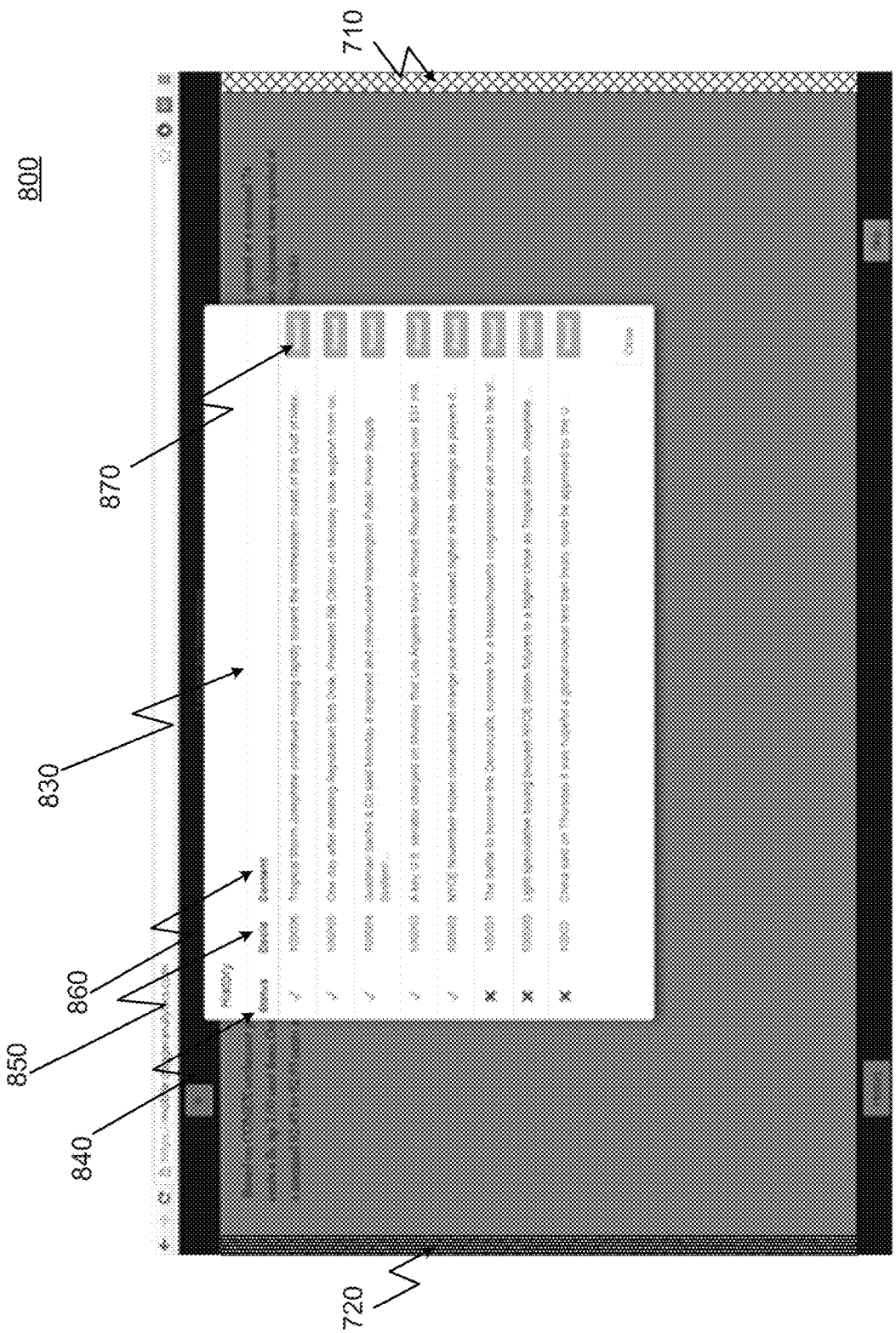
FIG. 8 is an exemplary screenshot of DR performed on a DR system, consistent with certain disclosed embodiments.

Referring to FIG. 8, an exemplary screenshot 800 is provided to illustrate the output resulting when a user selects the "history" button 740. As illustrated in FIG. 8, when a user selects the "history" button 740, a history page 830 may be superimposed over the document being reviewed. The history page 830 may include information about documents previously reviewed by the user, with each row including information about a single document. For example, for each document, history page 830 may include a status column 840 indicating a status of the document, as determined by the user (e.g., responsive, not responsive, etc.), a date column 850 indicating when the document was reviewed, a comment column 860 including any comments added by the user via the user interface of the display 215, and a revisit column 870 including selectable "revisit" buttons that allow the user to revisit and/or perform additional review of the document listed in the corresponding row.

Additional tags may be applied to the document at the same time as applying tags via user swiping. Specifically, additional buttons may be provided on the display 215 to allow a user to select additional templates, tags, and/or tag values to be applied to the document. In one example, clicking the button may cause a change in a default tag value of a default tag applied to the document. For example, for a tag of "Privileged" (e.g., attorney-client privileged) documents may be set to a default tag value of "FALSE" or negative, indicating the document is not privileged. Clicking the star button 730 during the review of the document may act to change the tag value of the "Privileged" tag of the document to "TRUE" or positive; failing to click the star button 730 during the review of the document causes the document to be tagged (or remain tagged) with the default tag setting of "FALSE" or negative for the tag category of "privileged." As it is typical that most documents that are reviewed are not privileged in a DR, the additional action of requiring a user to click a button for applying a positive tag value for the tag of "attorney-client privileged" is avoided for most documents. Thus, as will be appreciated, for a majority of documents to be reviewed, a single swiping or drag-and-drop input by a user may be used to remove a displayed first document and transition to display a second document on the display 215, while this single dragging input may also cause the appropriate responsive tag value (e.g., "TRUE" or "FALSE") and the appropriate privileged tag value (e.g., "FALSE") to be associated with the reviewed document. It will be appreciated that other templates of tags and tag values may be associated with the single drag-and-drop input.

Returning to FIG. 4, the DR computing device 110 of DR system 100 may receive user input responsive to a displayed document (420). In the disclosed embodiments, the received user input may include simple or intuitive gestures or movements via, for example, display 215. For example, the user may place a finger on a touchscreen display 215 and "swipe" or "drag" documents in a particular direction or select a single button displayed on display 215. Although the disclosed embodiments illustrate dragging in the vertical left and right directions on the display 215, the dragging may be in any direction or number of directions. For example, the user may swipe or drag in horizontal up and down directions or in diagonal directions on the display 215. In some embodiments, the movements, gestures or swipes may consist of a series of swipes on display 215. For example, a user may drag the document upward on display 215 and, without releasing the item, drag the document to the left or right on display 215.

Further, the DR computing device 110 of DR system 100 may provide contemporaneous feedback to the user. For example, as the document is dragged (user swipe), the DR computing device 110 of DR system 100 may be configured to show the user visual confirmation indicia 910, 920 in response to the user drag operation to apply the prescribed templates, tags, and/or tag values. Referring to FIG. 9A, which shows example screenshot 900a, a positive visual confirmation indicator 910 (e.g., green checkmark) may be overlaid on the document if the primary template will be applied and/or marked as TRUE (e.g., a template with tag/tag values including responsive, not privileged, and not confidential) in response to the user gesture (e.g., drag) to apply the primary category tag of TRUE. Or, referring to FIG. 9B, which shows example screenshot 900b, a negative visual confirmation indicator 920 (e.g., red X) may be overlaid on the document if the primary template will be applied and/or marked as FALSE (e.g., a template with tag/tag values including one or more of not responsive, privileged, confidential) in response to the user gesture (e.g., drag) to apply the primary category of FALSE. This feedback may provide an extra layer of security and quality assurance as it alerts the user to the categorization applied to the document. Such visual confirmation indicia 910, 920 may be displayed on top of the document display location and may cover a large area to help assure the tag application to the document is properly communicated to the user. As the user has already reviewed the document, interference of these additional confirmation indicia 910, 920 with the review of the document may be less important at this time than the importance of assuring the user intended tag categorization corresponds to the gesture input action of the user.

Other visual indicators may be used as alternatives or in addition to that described herein. For example, thumbs-up or thumbs-down symbols may be used. As another example, text may be used as indicia. The text may correspond to the templates, tags, and/or tags being applied. Thus, if the tag being applied with the user dragging motion is "responsive," the positive visual confirmation indicator 910 may be the green word "RESPONSIVE" and the negative visual confirmation indicator 920 may be the red phrase "NOT RESPONSIVE." In this example, the colors, words and/or phrases of the visual confirmation indicia 910 and 920 may be changed in response to a change in the templates, tags, and/or tag values being tagged with the user dragging motion. For example, if a user input setting changes the tag to be applied with the user dragging motion to "privileged," the system may be responsive to this input so that the positive visual confirmation indicator 910 may be the green word "PRIVILEGED" and the negative visual confirmation indicator 920 may be the red phrase "NOT PRIVILEGED." In some examples, templates associated with plural tags may result in the visual confirmation indicator listing a plurality of tags, such as in plural text lines (such as "Privileged" on a first line of the display and "Not Responsive" on a second line of the display below the first line).

In some examples, the visual confirmation indicia 910, 920 may be partially transparent so that text of the document is still visible or readable through the visual confirmation indicia 910, 920. In some examples, the visual confirmation indicia 910, 920 may uniquely share a characteristic with the corresponding tag visual cue side bar associated with the tagging. The pair of positive visual confirmation indicia 910 and the positive visual cue side bar 710 may share a characteristic (e.g., same color, same indicia such as same symbol, character or text, etc.) where that characteristic is not present in either of the negative visual confirmation indicia 920 and the negative visual cue side bar 720 (and vice versa). For example, in applying a "TRUE" or positive correspondence between a document and a template, tags, and/or tag values, the positive visual cue side bar 710 and the positive visual confirmation indicia 910 may share the same color of green and/or the use of the same check symbol (where the color green and check mark symbol are not used for the negative visual cue side bar 720 or the negative visual confirmation indicia 920); in applying a "FALSE" or negative correspondence between a document and a template, tags, and/or tag values, the negative visual cue side bar 720 and the negative visual confirmation indicia 920 may share the same color of red and/or the use of the same "x" symbol (where the color red and "x" symbol are not used for the positive visual cue side bar 720 or the positive visual confirmation indicia 920).

In some examples, the initiation of a user drag input on display 215 may cause the display of the visual confirmation indicia 910, 920 on display 215, but may be insufficient to cause tagging of the document associated with the user drag; tagging of the document and display of the next document may be performed only upon completion of the user "drag-and-drop" or "drag-and-release." Thus, the display of the visual confirmation indicia 910, 920 may provide to a user the option to abort the user drag input to completion and thereby prevent tagging the document with an unwanted or unintentional tag. In exemplary embodiments, a complete user "drag-and-drop" or "drag-and-release" causing appropriate tagging and display of the next document may require a certain drag length, a certain drag speed or acceleration, or a combination of two or more of these variables. For example, to complete tagging a document using a dragging input, the system may require a user to drag a finger (or other touching item) across a touchscreen display 215 for a minimum of a predetermined fixed or programmable distance (e.g., two inches), or a minimum of a percentage of the touchscreen display width of the display 215 (e.g., 25% of the display width), or a minimum of the lesser of a predetermined fixed or programmable distance and a percentage of the touchscreen display 215 (e.g., a minimum of the lesser of two inches and 25% of the display width). As the user starts the dragging motion to achieve the tagging with this dragging input, the corresponding visual confirmation indicia 910, 920 may be displayed to the user in response to detecting the initiation of the drag. If the user completes the drag of the minimum drag distance, the document may be appropriately tagged and the next document may be shown to the user. However, if the user aborts the drag, does not perform a drag of the minimum distance, or otherwise does not complete the full required drag, the display of the visual confirmation indicia 910, 920 may be removed and the display may revert to display of the same document (and the tagging of the document that would have been caused by a completion of the full drag may be avoided).

Referring again to FIG. 4, the DR computing device 110 of DR system 100 may apply the templates, tags, and/or tag values associated with the received user input (425). In some embodiments, the DR computing device 110 of DR system 100 may apply the selected template, tags, and/or tag values when the user input is complete. For example, the DR computing device 110 of DR system 100 may apply a template, tag, and/or tag values when the user lifts their finger from the screen following a "drag-and-drop" or "drag-and-release" motion.

After the DR computing device 110 of DR system 100 applies the selected template, tags, and/or tag values to the document, the DR computing device 110 of DR system 100 may automatically save the information related to the selected templates, tags, and/or tags values (430). For example, the DR computing device 110 may save a document identification number (e.g., a document ID) and corresponding templates values, tags, and/or tag values in storage 216.

Figures 10A, 10B:
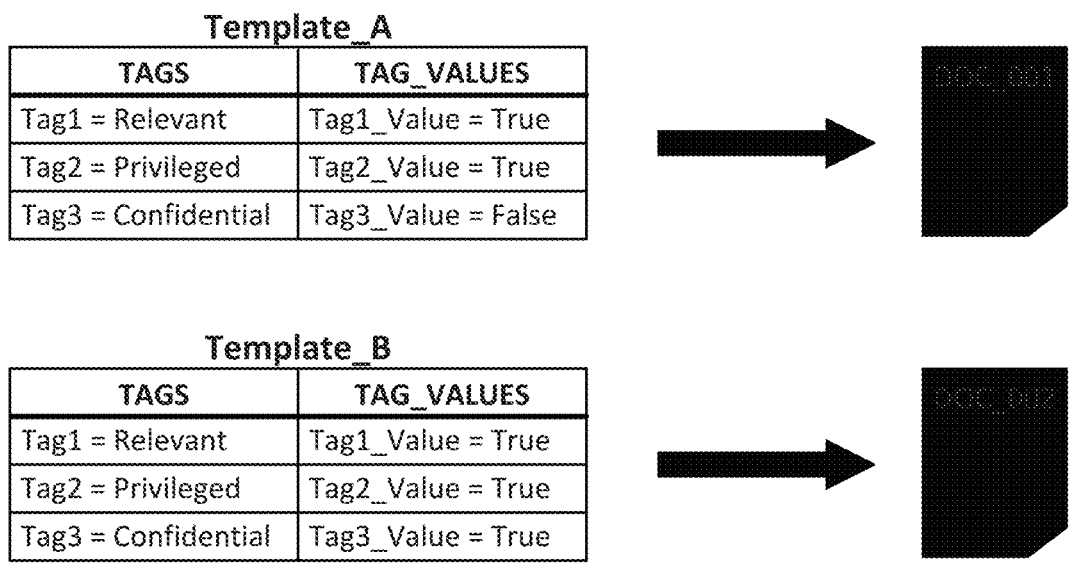
FIG. 10A is a block diagram illustrating the application of templates, tags, and tag values to documents, consistent with certain disclosed embodiments.
FIG. 10B is a table illustrating the association of document identification numbers, tags, and tag values, consistent with certain disclosed embodiments.

FIG. 10A is a block diagram illustrating the application of templates, tags, and tag values to documents, consistent with certain disclosed embodiments. FIG. 10B is a table illustrating the association of document identification numbers, tags, and tag values, consistent with certain disclosed embodiments. As shown in FIGS. 10A and 10B, one or more templates can be defined for a DR, each template including one or more tags and corresponding tag values. In the embodiments of FIGS. 10A and 10B, the tag values may be defined separately from the tags or tag labels.

In the illustration of FIGS. 10A and 10B, DR system 100 may include two templates, e.g., Template_A and Template_B, respectively applied to two documents identified by their document identification numbers, e.g., DOC_001 and DOC_002. When Template_A is applied to DOC_001, DR computing device 110 may associate and store with DOC_001 the three tags and associated tag values corresponding to Template_A (e.g., "Relevant" tag with tag value of "TRUE," "Privileged" tag with tag value of "TRUE," and "Confidential" with tag value of "FALSE"). When Template B is applied to DOC_002, DR computing device 110 may associate and store with DOC_002 the three tags and associated tag values corresponding to Template_B (e.g., "Relevant" tag with tag value of "TRUE," "Privileged" tag with tag value of "TRUE," and "Confidential" with tag value as "TRUE"). As illustrated in the exemplary embodiment of FIG. 10B, the document identification numbers (i.e., "DOC_ID"), tags (i.e., "TAGS"), and/or tag values (i.e., "TAG_VALUES") may be stored in a table format in storage 216.

Figures 11A, 11B:
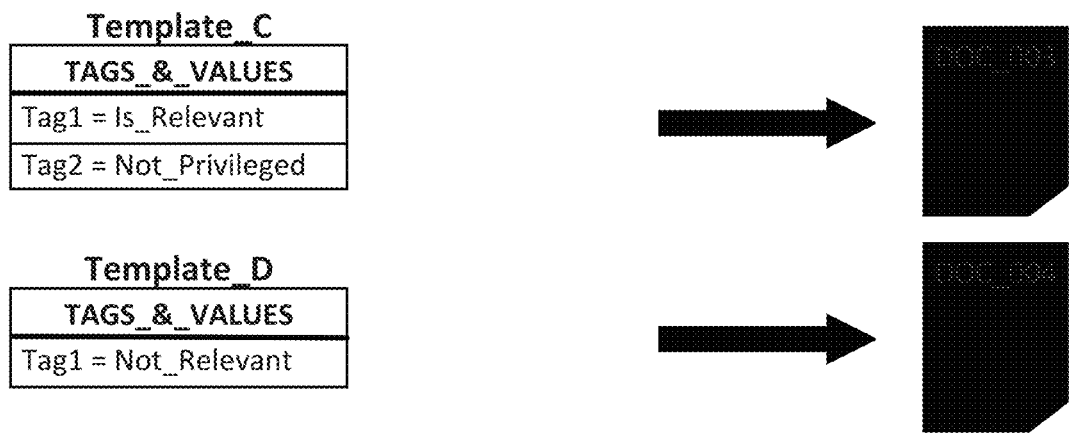
FIG. 11A is a block diagram illustrating the application of templates and tags having values to documents, consistent with certain disclosed embodiments.
FIG. 11B is a table illustrating the association of document identification numbers and tags having values, consistent with certain disclosed embodiments.

FIG. 11A is a block diagram illustrating the application of templates and tags having values to documents, consistent with certain disclosed embodiments. FIG. 11B is a table illustrating the association of document identification numbers with tags having values, consistent with certain disclosed embodiments. As shown in FIGS. 11A and 11B, one or more templates can be defined for a DR, each template including one or more tags with corresponding values. In the embodiments of FIGS. 11A and 11B, the value associated with any given tag may be defined in combination with the tag or tag label. For example, a single code or data value may represent both the tag and the tag value.

In the illustration of FIGS. 11A and 11B, DR system 100 may include two templates, e.g., Template_C and Template_D, respectively applied to two documents identified by their document identification numbers, e.g., DOC_003 and DOC_004. When Template C is applied to DOC_003, DR computing device 110 may associate and store with DOC_003 the two tags/values combinations corresponding to Template_C (e.g., "Is_Relevant" and "Not_Privileged"). When Template D is applied to DOC_004, DR computing device 110 may associate and store with DOC_004 the single tag/value combination corresponding to Template_D (e.g., "Not_Relevant" tag). As illustrated in the exemplary embodiment of FIG. 11B, the document identification numbers (i.e., DOC_ID) and tags/values (i.e., TAGS_&_VALUES) may be stored in a table format in storage 216.

Although not illustrated, in some embodiments, the examples illustrated in FIGS. 10A, 10B, 11A, and 11B may be combined. For example, a single DR may include all four templates illustrated in FIGS. 10A, 10B, 11A, and 11B (e.g., Template_A, Template_B, Template_C, and Template_D). In such embodiments, the "TAGS" column illustrated in FIG. 10B may be used for both the "TAGS" of Template_A and Template_B, as well as the "TAGS_&_VALUES" of Template_C and Template_D. When DR computing devices 110, DR servers 120, and/or DR databases 130 encounter a code for "TAGS_&_VALUES" in a "TAGS" column, DR computing devices 110, DR servers 120, and/or DR databases 130 may ignore any information found in the "TAG_VALUES" column.

Moreover, although not illustrated, in some embodiments, DR computing device 110 may store only the template name (e.g., Template_A, Template_B, Template_C, Template_D, etc. with the document identification (e.g., DOC_901, DOC_002, DOC_003, DOC_004), and DR server 120 and/or DR database 130 may use the template name and information about the template to translate the template name to tags, tag values, or tags having values.

When the user has completed reviewing the documents, the document identifications and corresponding properties (e.g., templates, tags, and/or tag values) may be uploaded from the DR computing device 110 to the DR servers 120 and/or DR databases 130 (435). In some embodiments, the document identifications and/or corresponding properties may be uploaded from the DR computing device 110 to the DR servers 120 and/or DR databases 130 (435) via, for example, network 140. Documents and corresponding properties may be uploaded sequentially one at-a-time, or may be uploaded simultaneously (altogether or in groups).

Although descriptions herein refer to the use of a touchscreen display 215 and finger movement, the disclosed embodiments encompass all types of actions that communicate directionality to a computing device. Such actions may include, for example, touch-based (e.g., finger and/or stylus taps, touches, drags, swipes, etc. on a touchscreen display 215), keyboard-based (e.g., key strokes, shortcut keys, etc. on a keyboard I/O device 214), mouse-based (e.g., clicks (right or left), rollerball, click-and-drag, etc. of a mouse I/O device 214). In some embodiments, a camera or other visual detection device may be used to receive input, such as detecting and tracking eye movements or hand gestures. For example, the camera or other device may track eye movements (e.g., left, right, up, down, diagonal, etc.) and a maintained focus of the eyes (e.g., staring at a point for a predetermined period of time).

The present disclosure is not to be limited in terms of the particular embodiments described in this application, which are intended as illustrations of various aspects. Many modifications and variations can be made without departing from its spirit and scope, as will be apparent. Functionally equivalent methods and apparatuses within the scope of the disclosure, in addition to those enumerated herein, will be apparent from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

The foregoing description, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

What is claimed is:

1. A computer-implemented method for applying document review (DR) tags using a portable computing device, comprising:
    loading a plurality of documents for review into a memory of the portable computing device;
    displaying, via a display of the portable computing device, a first document of the plurality of documents;
    receiving, via the display, a first touchscreen user swipe input related to the first document, wherein the first touchscreen user swipe input corresponds to a first tag and a first tag value associated with the first tag;
    upon initiation of the first touchscreen user swipe input related to the first document, displaying as an overlay to the first document a first visual indicator corresponding to the first touchscreen user swipe input;
    in response to completion of the first touchscreen user swipe input, applying to the first document the first tag value corresponding to the first tag;
    storing, in the memory, the first tag value associated with the first tag in a correspondence with the first document; and
    in response to the completion of the first touchscreen user swipe input, displaying a second document of the plurality of documents,
    wherein the displaying as the overlay to the first document the first visual indicator corresponding to the first touchscreen user swipe input further comprises:
    displaying the first visual indicator with first characteristics in response to a responsive tag value being applied to the first document; or
    displaying the first visual indicator with second characteristics in response to a non-responsive tag value being applied to the first document.

2. The computer-implemented method of claim 1, further comprising:
    displaying a third document of the plurality of documents;
    upon initiation of the first touchscreen user swipe input related to the third document, displaying as an overlay to the third document the first visual indicator; and
    in response to abortion of the first touchscreen user swipe input, clearing from the display the overlay to the third document without applying the first tag value corresponding to the first tag to the third document.

3. The computer-implemented method of claim 1, further comprising:
    detecting, via the display, a directional motion of the first touchscreen user swipe input; and
    determining a direction of the directional motion,
    wherein the first tag value depends on the determined direction of the directional motion.

4. The computer-implemented method of claim 1, wherein in response to completing of the first touchscreen user swipe input, a tag value associated with at least one additional tag is applied to the first document.

5. The computer-implemented method of claim 1, further comprising:
    uploading, via the Internet, the first tag and the first tag value and a first document identification that identifies the first document.

6. The computer-implemented method of claim 1, further comprising:
    displaying, via the display, a first visual indicia at a first edge of the display and a second visual indicia at a second edge of the display, the first edge and the second edge being located on opposite sides of the display,
    wherein the first edge of the display is located at a position to where a user drags the first document to apply the responsive tag value indicating the first document is responsive and the second edge of the display is located at a position to where the user drags the first document to apply the non-responsive tag value indicating the first document is not responsive.

7. The computer-implemented method of claim 1,
    wherein the first characteristics are different from the second characteristics.

8. The computer-implemented method of claim 7, wherein the first characteristics are a first color and the second characteristics are a second color, different from the first color.

9. The computer-implemented method of claim 1, further comprising:
    displaying, via the display, a selectable indicator button;
    associating a tag value of a first type for an auxiliary tag to the first document;
    upon receiving input corresponding to a selection of the selectable indicator button, applying a tag value of a second type for the auxiliary tag to the first document; and
    storing, in the memory, the tag value of the second type in a record to associate the tag value of the second type with the auxiliary tag and the first document.

10. A system for applying document review (DR) tags using a portable computing device, comprising:
    at least one memory storing instructions;
    a touchscreen display; and
    at least one computer processor configured to execute the instructions and to cause the system to perform operations comprising:
    loading a plurality of documents for review into a first memory of the at least one memory of the portable computing device;
    displaying, via the touchscreen display, a first document of the plurality of documents;

while displaying the first document, receiving, via the touchscreen display, a first touchscreen user swipe input;

upon initiation of the first touchscreen user swipe input related to the first document, displaying as an overlay to the displayed first document, a first visual indicator corresponding to the first touchscreen user swipe input;

in response to an abortion of the first touchscreen user swipe input, clearing from the touchscreen display the overlay to the first document; and in response to a completion of the first touchscreen user swipe input, storing a tag value of a first tag to associate the tag value of the first tag with the first document, wherein when the at least one computer processor is further configured to execute the instructions and to cause the system to perform operations comprising:

displaying the first visual indicator with first characteristics in response to a responsive tag value being applied to the first document; or displaying the first visual indicator with second characteristics in response to a non-responsive tag value being applied to the first document.

11. The system of claim 10, wherein the at least one computer processor is further configured to determine a directional motion of the first touchscreen user swipe input, select a first value as the tag value of the first tag in response to determining the directional motion of the first touchscreen user swipe input corresponds to a first direction and to select a second value as the tag value in response to determining the directional motion of the first touchscreen user swipe input corresponds to a second direction.

12. The system of claim 10, wherein the at least one computer processor is further configured to execute the instructions and to cause the system to perform operations comprising:

in response to completing of the first touchscreen user swipe input, storing a tag value of a second tag to associate the tag value of the second tag with the first document.

13. The system of claim 10, wherein the at least one computer processor is further configured to execute the instructions and to cause the system to perform operations comprising:

uploading, via the Internet, the tag value and a document identifier.

14. The system of claim 10, wherein the at least one computer processor is further configured to display, via the touchscreen display, a first visual indicia at a first edge of the touchscreen display in response to determining the first touchscreen user swipe input is in a direction towards the first edge of the touchscreen display and to display, via the touchscreen display, a second visual indicia at a second edge of the touchscreen display, in response to determining the first touchscreen user swipe input is in a direction towards the second edge of the touchscreen display.

15. The system of claim 14, wherein the first visual indicator and the first visual indicia share a first characteristic not shared by the second visual indicator and the second visual indicia, the second visual indicator and the second visual indicia share a second characteristic not shared by the first visual indicator and the first visual indicia, and the first characteristic is different from the second characteristic.

16. A non-transitory computer-readable storage medium storing instructions for applying document review (DR) tags using a portable computing device, the instructions causing one or more computer processors to perform operations according to a method comprising:

loading a plurality of documents for review into a memory of the portable computing device;

displaying, via a display of the portable computing device, a first document of the plurality of documents;

receiving, via the display, a first touchscreen user swipe input related to the first document, wherein the first touchscreen user swipe input corresponds to a first tag and a first tag value associated with the first tag;

upon initiation of the first touchscreen user swipe input related to the first document, displaying as an overlay to the first document a first visual indicator corresponding to the first touchscreen user swipe input;

in response to completion of the first touchscreen user swipe input, applying to the first document the first tag value corresponding to the first tag;

storing, in the memory, the first tag value associated with the first tag in a correspondence with the first document; and in response to the completion of the first touchscreen user swipe input, displaying a second document of the plurality of documents, wherein displaying as the overlay to the first document the first visual indicator corresponding to the first touchscreen user swipe input further comprises:

displaying the first visual indicator with first characteristics in response to a responsive tag value being applied to the first document; or displaying the first visual indicator with second characteristics in response to a non-responsive tag value being applied to the first document.

17. The non-transitory computer-readable storage medium of claim 16, further comprising:

detecting, via the display, a directional motion of the first touchscreen user swipe input; and determining a direction of the directional motion.

18. The non-transitory computer-readable storage medium of claim 16, further comprising:

displaying, via the display, a first visual indicia at a first edge of the display and a second visual indicia at a second edge of the display, the first edge and the second edge being on opposite sides of the display, wherein the first edge of the display is located at a position to where a user drags the first document to apply the responsive tag value indicating the first document is responsive and the second edge of the display is located at a position to where the user drags the first document to apply non-responsive tag value indicating the first document is not responsive.

19. The non-transitory computer-readable storage medium of claim 16, wherein the first characteristics are different from the second characteristics.

20. The system of claim 14, wherein the at least one computer processor is further configured to select a first value as the tag value of the first tag in response to determining the first touchscreen user swipe input is in the direction towards the first edge of the touchscreen display and to select a second value as the tag value in response to determining the first touchscreen user swipe input is in the direction towards the second edge of the touchscreen display.

21. The system of claim 14, wherein the first and second edges of the touchscreen display are at opposite sides of the touchscreen display.

22. The system of claim 14, wherein the first visual indicator and the first visual indicia comprise a first color not shared with the second visual indicator and the second visual indicia and the second visual indicator and the second visual indicia comprise a second color not shared with the first visual indicator and the first visual indicia.

23. The system of claim 14, wherein the first visual indicator and the first visual indicia substantially consist of a first symbol and the second visual indicator and the second visual indicia substantially consist of a second symbol, wherein the first symbol is different from the second symbol.

24. The system of claim 10,
   wherein the at least one computer processor is configured to determine a distance of the first touchscreen user swipe input; and
   wherein the at least one computer processor determines that the first touchscreen user swipe input is aborted when the first touchscreen user swipe input does not achieve a predetermined distance.

25. The system of claim 10, wherein the at least one computer processor determines that the first touchscreen user swipe input is completed only if the distance of the first touchscreen user swipe input exceeds a predetermined distance.

26. The system of claim 25, wherein the at least one computer processor is configured to display the first visual indicator upon initiation of the first touchscreen user swipe input at a time when the distance of the first touchscreen user swipe input is less than the predetermined distance.

* * * * *